R. DANIELS.
Straw Cutter.

No. 9,684.

3 Sheets—Sheet 1.

Patented April 26, 1853.

R. DANIELS.
Straw Cutter.

No. 9,684.

3 Sheets—Sheet 2.

Patented April 26, 1853.

R. DANIELS.
Straw Cutter.

3 Sheets—Sheet 3.

No. 9,684.

Patented April 26, 1853.

UNITED STATES PATENT OFFICE.

REUBEN DANIELS, OF WOODSTOCK, VERMONT.

STRAW-CUTTER.

Specification of Letters Patent No. 9,684, dated April 26, 1853.

*To all whom it may concern:*

Be it known that I, REUBEN DANIELS, of Woodstock, in the county of Windsor and State of Vermont, have invented certain new and useful Improvements in the Machine for Cutting Straw, &c., patented to me on July 2, 1850, of which the following is a full, clear, and exact description, reference being had to the annexed drawings, which make part of this specification, and in which—

Figure 1:
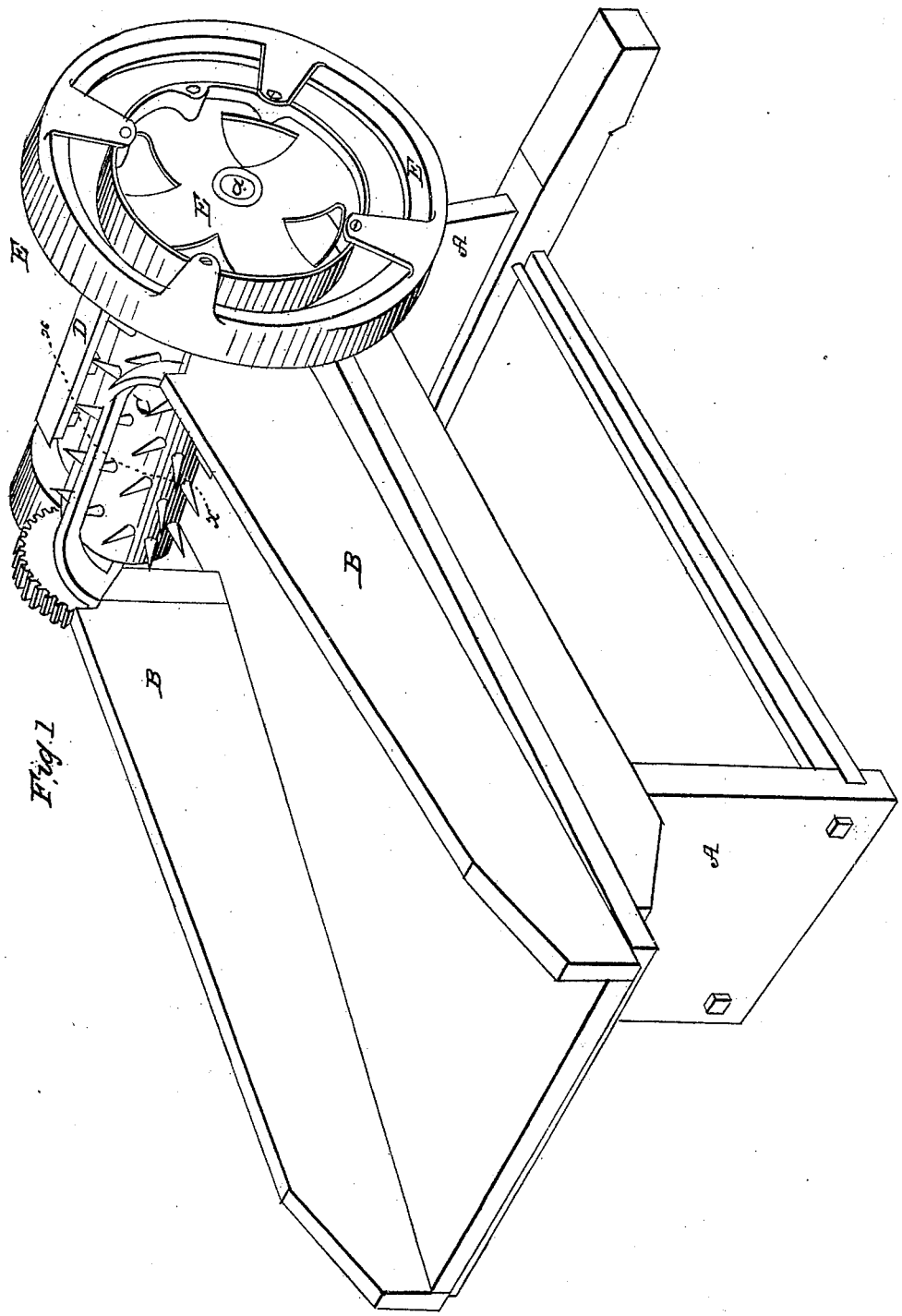
Figure 2:
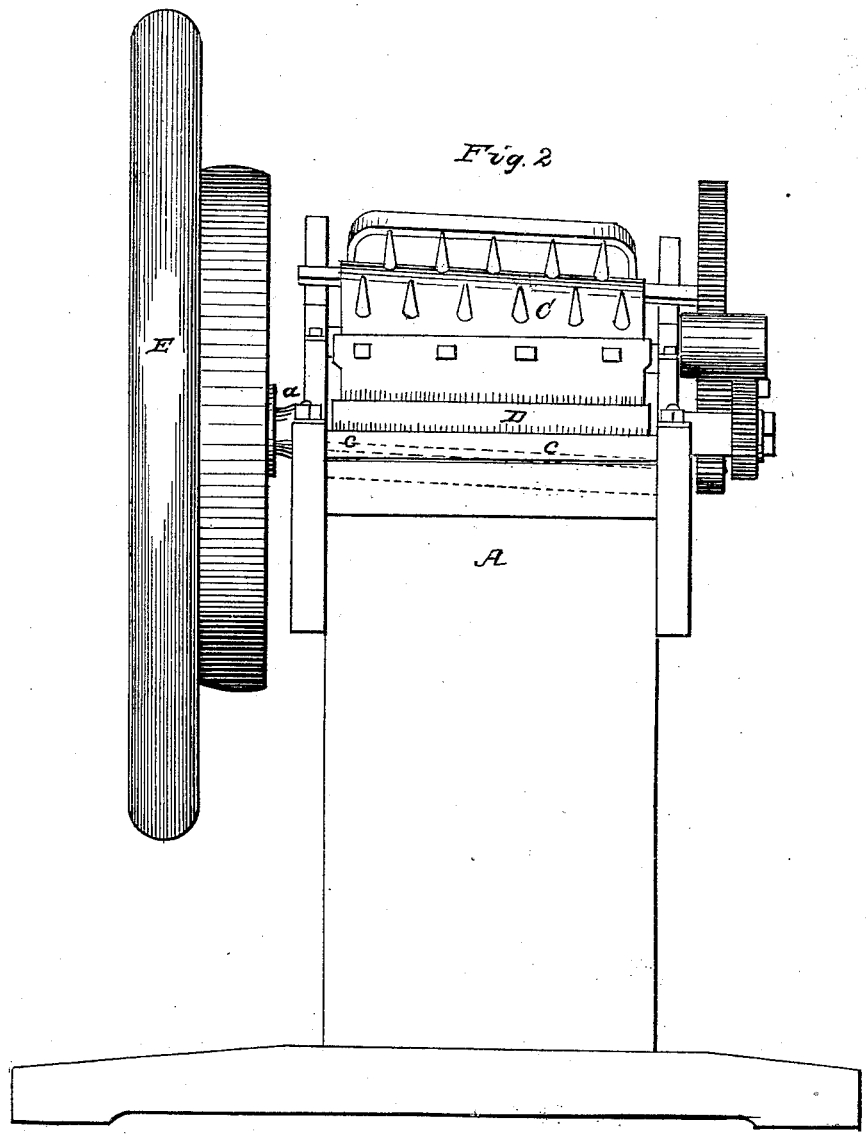
Figure 3:
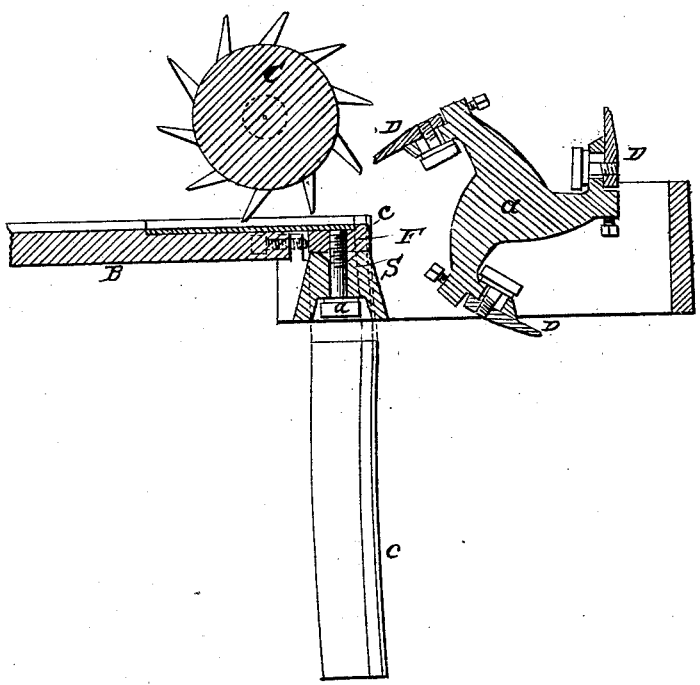

Figure 1 represents a view in perspective of a machine having my improvements applied thereto, Fig. 2 represents an end elevation of the same, and Fig. 3 represents a vertical longitudinal section of the same at the line $x\ x$ of Fig. 1.

The object of my present improvement is, to adapt my said machine to the cutting of brushwood and twigs, with a view to reduce them to a granular state. The machine aforesaid patented in July, 1850, I found to work well as a straw cutter, but when I came to apply it to the cutting of brushwood which is much harder work, and which subjected its cutting power to a far more serve test, I discovered a radical defect in the principle of its construction, which the lighter work of cutting straw failed to develop. This defect is the tendency of the edges of the rotating knives to spring out radially and overlap the edge of the fixed knife, and thus bringing up the machine to a dead stop, or breaking it. This tendency to overlap I found to result mainly, from the tendency of the knives to spring out and increase the diameter of their circle of rotation in proportion to the amount of strain to which they are subjected in the act of cutting, so that, while the strain does not exceed a certain amount, the machine will work well, but in cutting brushwood the hardness of knots, variation in the sizes of sticks, and the different degrees of hardness, and toughness, renders it impossible to set the rotating knives so as to prevent the danger of overlapping the stationary one, when they have to cut an unusually refractory piece of wood, unless they are set to run so far from the stationary one, that their efficiency in ordinary and more easy cutting is impaired.

I have discovered that if the fixed knife is placed obliquely to a plane passing through the axis of the rotating knives, the tendency of the latter to overlap the former will be effectually counteracted. This result is due to two causes, first, the shearing cut which this oblique position of the knives produces, whereby the wood is severed with greater ease and less strain upon the cutting edges; and second, the support which the part of the knife in the act of cutting, receives from that part which is in advance of the cutting point, and supported against the front side of the stationary knife, whereby the rotating blades are prevented from springing so as to overlap the fixed blade.

In the accompanying drawing of one of my machines the frame (A), the feed trough (B), the toothed feeding roller (C), the rotating cutting knives (D), the gearing which connects the feed roller and the rotary cutters or cutting-cylinder; the arrangement of the balance wheel (E), the bearings and frame of the turning parts of the mechanism, are all substantially the same as the corresponding parts of the machine patented by me in July 1850 aforesaid, and therefore a description of those parts is here unnecessary.

Instead of arranging the stationary knife (F) parallel to a radial plane passing through the axis ($a$) of the rotary cutters, as in my said patented machine, I place it in a position oblique to such a plane as seen in Fig. 2, (where the fixed knife is represented by red lines), and as the rotating knives are parallel as well as concentric to the axis on which they are mounted, they and the fixed knife are oblique to each other like the blades of a pair of shears. The fixed knife is made from a strong bar of steel, and is perforated at suitable intervals with holes to admit screw-bolts to secure it to the frame. The upper front corner ($c$) of this knife, is the cutting edge, and is slightly curved to conform to the curvature of the cylinder described by the revolution of the rotating cutters. From this construction it follows, that the edges of the rotating and fixed cutters will meet as accurately as if both were straight, and both parallel to the axis of the cylinder. The fixed cutter is made with a perfectly straight and true edge and properly tempered, it then has the proper curvature given to it in the machine by springing it down by means of the screw-bolts ($d$), to a curved seat ($s$), on the frame; the curvature of this seat will be greater or less as the obliquity of the fixed knife to the cylinder is greater or less, and the proper degree of curvature can be determined, by marking out upon the concave surface of a cylinder of radius equal to that of the rotating knives, a line in the same vertical plane as the line which joins the two points on the opposite extremities of the cylinder, where the ends of the cutting edge of the fixed knife are required to terminate; in order to produce the required degree of obliquity to the axis of the cylinder. When the screws that confine the knife arranged in this way are unloosed, the knife will instantly spring back until it becomes straight again. This circumstance affords great facilities for keeping the knife in order, as it can be ground to sharpen it while straight, and then bent into the proper curve again. If it was made of the proper curve in the first place, it would have to be ground to fit a templet every time it had to be sharpened, and even then it would be very difficult to keep it of the true curvature to match the rotating knives. Either of these methods or any other may be employed to make the fixed knife match truly the rotating ones.

What I claim as my invention and desire to secure by Letters Patent is—

The combination of a series of straight rotating blades whose cutting edges are equidistant from and parallel to a common axis of rotation and hence describe a cylinder when they rotate, with a fixed blade having a curved edge given to it as described and corresponding to a line drawn obliquely on the cylinder generated by the rotating blades, and set in a position coinciding with that line; whereby a series of straight knives on a cylinder are made to cut obliquely, or with a shearing cut by the oblique adjustment of the fixed blade only.

In testimony whereof I have hereunto subscribed my name.

REUBEN DANIELS.

Witnesses:
A. B. CHILDS,
P. H. WATSON.